US010462686B2

(12) United States Patent
García et al.

(10) Patent No.: US 10,462,686 B2
(45) Date of Patent: Oct. 29, 2019

(54) OVER THE AIR (OTA) BEAMFORMING TESTING WITH A REDUCED NUMBER OF RECEIVERS

(71) Applicant: Keysight Technologies, Inc., Santa Rosa, CA (US)

(72) Inventors: Francisco Javier Campos García, Fuengirola (Málaga) (ES); Binu Mathew, Hampshire (GB)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/790,502

(22) Filed: Oct. 23, 2017

(65) Prior Publication Data

US 2019/0124529 A1  Apr. 25, 2019

(51) Int. Cl.
| | |
|---|---|
| *H04W 24/06* | (2009.01) |
| *H04B 17/391* | (2015.01) |
| *H04B 1/18* | (2006.01) |
| *H01Q 3/30* | (2006.01) |
| *H04W 88/08* | (2009.01) |
| *H01Q 1/24* | (2006.01) |
| *H01Q 21/24* | (2006.01) |
| *H04B 7/10* | (2017.01) |

(52) U.S. Cl.
CPC ............ *H04W 24/06* (2013.01); *H01Q 1/246* (2013.01); *H01Q 3/30* (2013.01); *H01Q 21/24* (2013.01); *H04B 1/18* (2013.01); *H04B 7/10* (2013.01); *H04B 17/3912* (2015.01); *H04W 88/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,053,882 | A  * | 10/1977 | Van Etten | G01S 7/025 342/188 |
| 8,588,856 | B2 | 11/2013 | Liu et al. | |
| 8,885,748 | B2 | 11/2014 | Chang | |
| 8,913,964 | B2 * | 12/2014 | Lundstrom | H04B 17/3912 455/67.11 |
| 8,995,511 | B2 | 3/2015 | Reed | |
| 9,203,482 | B2 | 12/2015 | Smith et al. | |
| 2013/0094601 | A1 * | 4/2013 | Chang | H04B 7/10 375/260 |
| 2017/0251437 | A1 * | 8/2017 | Bull | H04B 7/18519 |
| 2018/0034559 | A1 * | 2/2018 | Foegelle | H04B 17/0087 |
| 2018/0184382 | A1 * | 6/2018 | Bull | H04B 7/18519 |

\* cited by examiner

*Primary Examiner* — Junpeng Chen

(57) ABSTRACT

A testing system tests a device under test (DUT) by emulating at least one radio access protocol. The testing system includes at least one transmitter, multiple receivers, multiple radio frequency (RF) heads, multiple horns, and multiple combiners. The transmitter(s) are configured to use an intermediate frequency for transmission. The receiver(s) are configured to use an intermediate frequency for reception. The RF heads up-convert the intermediate frequency from the transmitter(s) to RF used by the DUT and down-convert the RF used by the DUT to the intermediate frequency used by the receiver(s). The combiners each correspond to a different receiver and combine beamformed signals received from the DUT via two different RF heads and via the horns. The horns transmit RF signals to the DUT and receive RF signals from the DUT using two different polarizations.

20 Claims, 9 Drawing Sheets

Figure 7B
Figure 7C
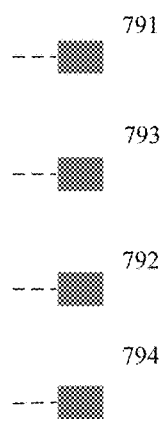
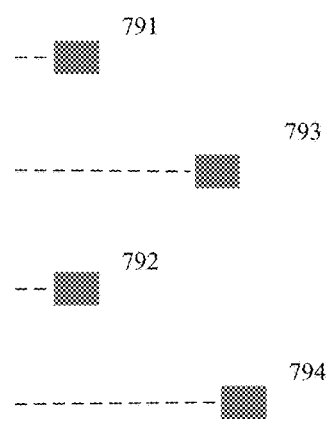
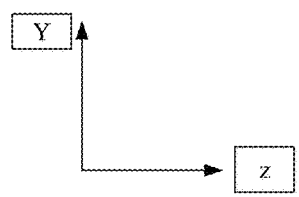
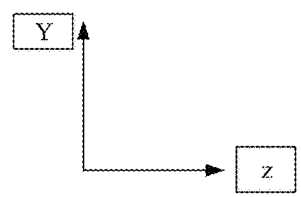

FIGURE 8A
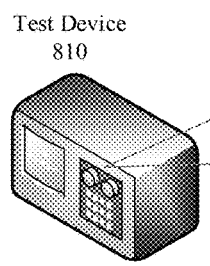
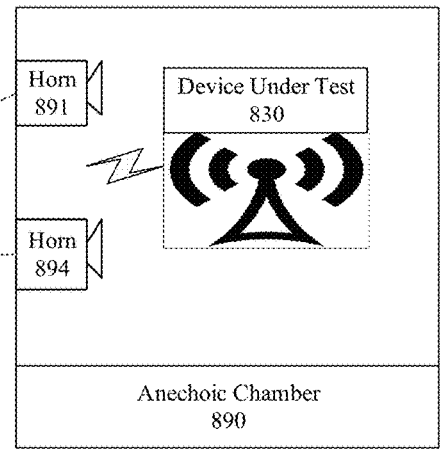
FIGURE 8B
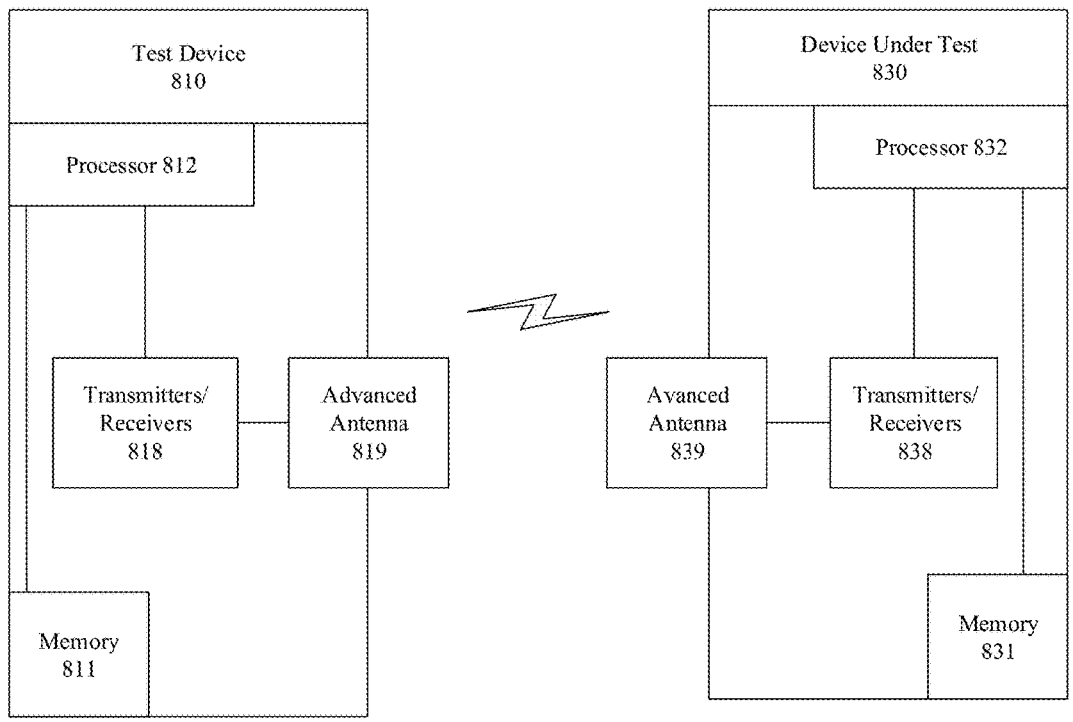

OVER THE AIR (OTA) BEAMFORMING TESTING WITH A REDUCED NUMBER OF RECEIVERS

BACKGROUND

In multiple-input multiple-output (MIMO) communications systems, antennas may be used on both a base station and on a mobile device to exploit a phenomenon known as multipath propagation to achieve higher data rates. In general, MIMO communications systems simultaneously send and receive multiple data signals over each radio channel. The multipath propagation phenomenon is the result of environmental factors that influence the data signals as they travel between the base station and the mobile device, including, for example, ionospheric reflection and refraction, atmospheric ducting, reflection from terrestrial objects and reflection from bodies of water. Because of these factors, the data signals experience multipath interference that results in constructive interference, destructive interference, or fading, and phase shifting of the data signals. The base stations and mobile devices of MIMO communications systems may each have an advanced antenna. For example, an advanced antenna may be configured as an antenna array or multiple radiating antenna elements configured on a single antenna, wherein each antenna (in an antenna array) and radiating antenna element (for a single antenna) is individually logically controllable to collectively form beams. A complex weight pattern is introduced to the advanced antenna in a time domain signal to form a beam.

MIMO communications systems require testing. A typical MIMO test system for testing a device under test (DUT) includes an anechoic chamber, the DUT in the anechoic chamber, a test system computer, and various electrical cables for interconnecting components. An anechoic chamber is a chamber designed to absorb reflections of sound (or electromagnetic) waves. The test system computer may be a network emulator that emulates a base station when the DUT is a mobile device, and a user equipment (UE) device emulator that emulates a mobile device when the DUT is a base station. During over the air (OTA) testing, the test system computer receives information from the DUT that the test system computer processes to evaluate the transmit and/or receive capabilities of the DUT as the DUT is subject to the over the air testing. The over the air testing may involve controlling an advanced antenna of the DUT, for example, to communicate by selectively controlling each antenna (in an antenna array) or radiating antenna element (for a single antenna) to form beams. Beam characteristics (e.g., total transmit power, error vector magnitude of modulation formats, antenna radiation pattern) are compared against expectations to measure whether the advanced antenna of the DUT works properly.

Millimeter wave (MMW, or mmWave) is also known as extremely high frequency (EHF) or very high frequency (VHF), and is the band of spectrum between 30 gigahertz (GHz) and 300 gigahertz. Centimeter wave (CMW, or cmWave) is also known as super high frequency (SHF), and is the band of spectrum between 3 gigahertz and 30 gigahertz. This entire band of spectrum is within the radio frequency spectrum, which extends between 3 kilohertz to 300 gigahertz. The next telecommunications standards (i.e., beyond the current 4G LTE telecommunications standards) are referred to as 5th generation (5G) telecommunications standards, and may standardize communications systems that use millimeter wave and/or centimeter wave technology. Telecommunications standards such as 5G and 4G LTE are examples of radio access protocols and standards that define a timing scheme including the order and timing of communications actions for communications in a defined portion of the radio frequency spectrum.

Electromagnetic waves with high frequencies in the area between 3 gigahertz and 300 gigahertz experience significant propagation loss (path loss) and diffraction. To overcome this high path loss and provide sufficient coverage to users on the edge of coverage in/of a cell using these high frequencies, beamformed signal transmissions use high directivity in the desired direction of transmission. This means that the radiation patterns of beams become narrower, which in turn may increase the number of beams or types of beams. Beamformed signal transmissions with high directivity are used by a network emulator that exercises a DUT with different signals each with a different angle of arrival (AoA). The testing setup for such over the air testing traditionally involves the network emulator communicating with the DUT via several fixed antennas radiating in a fixed set of directions in the anechoic chamber. Initially, for a communications system using high frequencies in the area between 3 gigahertz and 300 gigahertz, the network emulator performs beam-sweeping during initial access to a network by the DUT to transmit broadcast and synchronization signals in multiple spatial directions following a predefined pattern. The DUT will eventually determine an optimal spatial direction from the network emulator and use this information to determine the direction for transmissions from the DUT to the network emulator. Once this initial beam determination has been performed, subsequent data transmissions between the network emulator and the DUT occur over a single spatial direction pointed to the DUT.

In the testing exercises, the test purpose is to verify that the DUT correctly identifies the different signals, determines and selects the best angle of arrival, transmits to the network emulator accordingly and keeps track of how the angle of arrival changes to adapt to varying channel conditions. After the initial access process, beam-sweeping is repeatedly performed by the network emulator using different beams in a predefined pattern.

In conventional testing solutions which use discrete angles of arrival, the network emulator needs as many transmitters and receivers as different spatial directions and polarizations that will be used since there is no a-priori knowledge of the DUT transmission direction or polarization. For example, a setup may involve eight (8) different signals that can be transmitted in four different spatial directions by using two (2) polarizations, horizontal (H) and vertical (V) in each direction. These traditional solutions require the network emulator to have as many receivers as transmitters.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 7B illustrates an arrangement of horns in two dimensions (YZ) in a system for over the air beamforming testing with a reduced number of receivers, in accordance with a representative embodiment.

FIG. 7C illustrates another arrangement of horns in two dimensions (YZ) in a system for over the air beamforming testing with a reduced number of receivers, in accordance with a representative embodiment.

FIG. 8A illustrates a system overview for over the air beamforming testing with a reduced number of receivers, in accordance with a representative embodiment.

FIG. 8B illustrates details of a test device and DUT in the system overview of FIG. 8A for over the air beamforming testing with a reduced number of receivers, in accordance with a representative embodiment.

DETAILED DESCRIPTION

Figure 1:
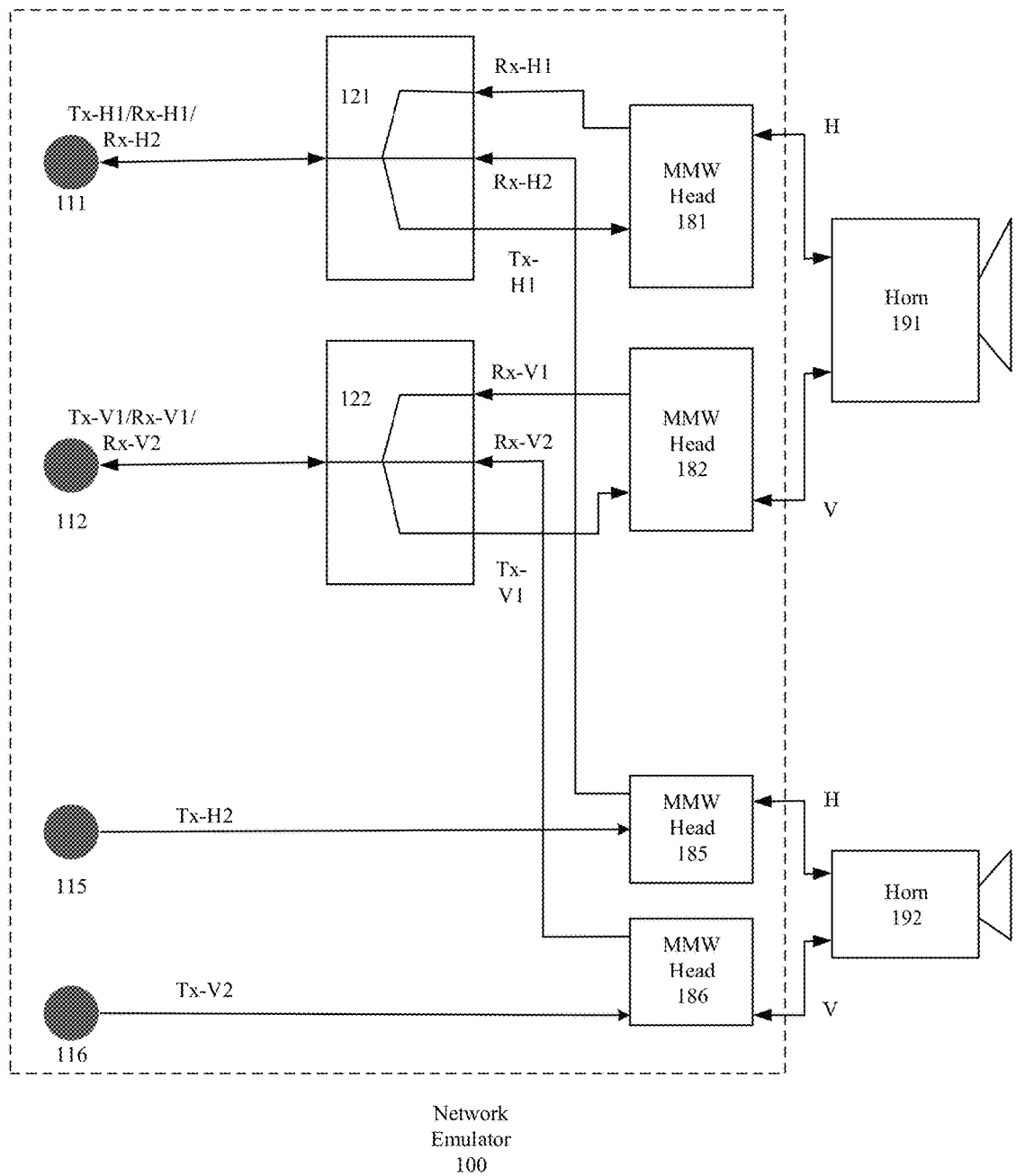
FIG. 1 illustrates a system for over the air beamforming testing with a reduced number of receivers, in accordance with a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only, and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Although a network emulator transmits signal in different spatial directions and polarizations, a DUT only uses one spatial direction to transmit to the network emulator at a time. In the embodiments described herein, the singular use by a DUT of one spatial direction at a time is exploited to reduce the number of required receivers in the network emulator. Received signals from different spatial directions (i.e., received by different fixed antennas from the DUT) are combined, such that the network emulator is connected to (communicates with) the DUT with fewer receivers. Insofar as the receivers of the network emulator may be considered individual connections with the DUT, received signals from different spatial directions are combined into a single connection to the network emulator. Multiple different connections that each combine multiple different signals from different spatial directions are described in relation to the embodiments below.

FIG. 1 illustrates a system for over the air beamforming testing with a reduced number of receivers, in accordance with a representative embodiment.

In FIG. 1, the system includes a network emulator 100, a source 111 (transceiver), a source 112 (transceiver), a source 115 (transmitter), a source 116 (transmitter), a horn 191, a horn 192, a combiner 121, a combiner 122, a MMW head 181, a MMW head 182, a MMW head 185, and a MMW head 186. The network emulator 100 is shown by dashes, and includes at least the source 111 (transceiver), the source 112 (transceiver), the source 115 (transmitter), the source 116 (transmitter), the MMW head 181, the MMW head 182, the MMW head 185, the MMW head 186, the combiner 121 and the combiner 122. The horn 191 and the horn 192 are provided in an anechoic chamber (not shown) that also includes a DUT (not shown). The sources 111, 112 (transceivers), the sources 115, 116 (transmitters), the combiners 121, 122 and the MMW heads 181, 182, 185, 186 may be representative of elements of the network emulator 100.

A "horn" as the term is used herein is representative of a horn antenna or a similar antenna. A horn antenna may also be known as a microwave horn, and is an antenna that typically consists of a metal waveguide shaped like a horn to direct radio waves in a beam. A horn may be used for UHF and microwave frequencies, such as from 300 Megahertz (MHz) to 300 Gigahertz. A "combiner" as the term is used herein is representative of a combiner, a combiner/splitter, or a similar component or device. A combiner combines two or more signals without translating either to produce a combined signal, whereas a splitter splits a combined signal into two or more signals. A "head" as the term is used herein is representative of a radio frequency head, and is a system used as an up-frequency converter or down-frequency converter. Down-frequency conversion involves converting a high-frequency signal such as a received high-frequency radio frequency signal lower to an intermediate frequency used by a device such as the network emulator 100. Up-frequency conversion involves converting the intermediate frequency used by the device such as the network emulator 100 to a high-frequency radio frequency signal for transmission. As a general matter, the conversion from a high-frequency radio frequency signal to a lower frequency may be carried out to improve performance of circuitry, such as circuitry of the network emulator 100 or another device that includes a transmitter, receiver and/or transceiver. The conversion to an intermediate frequency is performed by mixing a carrier signal with a local oscillator signal.

In FIG. 1, the horn 191 and the MMW head 181 communicate via signals with a horizontal polarization. Polarization expresses the orientation of the lines of electric flux in an electromagnetic field such as the signals between the horn 191 and the MMW head 181. The horn 191 and the MMW head 182 communicate via signals with a vertical polarization. The horn 192 and the MMW head 185 communicate with signals with a horizontal polarization. The horn 192 and the MMW head 186 communicate with signals with a vertical polarization. Each of the horns 191, 192 radiates primarily in a different angle of arrival.

In the system of FIG. 1, the received signals with horizontal polarizations Rx-H1 and Rx-H2 are provided from the MMW head 181 and the MMW head 185, respectively, to the combiner 121. The received signals with vertical polarizations Rx-V1 and Rx-V2 are provided from the MMW head 182 and the MMW head 186, respectively, to the combiner 122. Transmitted signals Tx-H1 from a source 111 (transceiver) are the only transmitted signals shown in FIG. 1 provided to the MMW head 181 via the combiner 121. Transmitted signals Tx-V1 from a source 112 (transceiver) are the only transmitted signals shown in FIG. 1 provided to the MMW head 182 via the combiner 122. Transmitted signals Tx-H2 from a source 115 (transmitter) are the only transmitted signals shown in FIG. 1 provided to the MMW head 185 directly, i.e., and not through any combiner detailed herein. Transmitted signals Tx-V2 from a source 116 (transmitter) are the only transmitted signals shown in FIG. 1 provided to the MMW head 186 directly, i.e., and not through any combiner detailed herein.

Each receiver in, for example the network emulator 100, demodulates received signals. In the embodiment of FIG. 1, the combiners 121, 122 combine received signals that would otherwise be individually provided to different dedicated receivers. Transmitted signals are not combined, and are instead individually provided each to a corresponding and dedicated MMW head among MMW heads 181, 182, 185, 186. Only two receivers or transceivers are used for all four received signals Rx-H1, Rx-H2, RxV1, Rx-V2 in FIG. 1. Therefore, the quantity of receivers and/or transceivers used for the four received signals in the testing is fewer than the number of MMW heads 181, 182, 185, 186 and smaller than the quantity of transmitters and/or transceivers used for transmissions in the testing. In the embodiment of FIG. 1, the quantity of receivers and/or transceivers used for the four received signals in the testing is one-half the quantity of transmitters and/or transceivers used for transmissions in the testing. Additionally, the MMW heads 181, 182, 185, 186 may be divided into groups of two, such that each set of MMW heads 181, 182, and MMW heads 185, 186 receives signals in two different polarizations from a single horn among the horns 191, 192. In other words, the MMW heads 181, 182, 185, 186 may be divided into groups of two rf heads, so that signals from each group of two rf heads are treated differently, by different components. Each group of two rf heads may receive signals with different polarizations (e.g., vertical and horizontal), where the different polarizations are in different planes such as perpendicular planes. The horn 191 and the horn 192 in FIG. 1 may be in an anechoic chamber, such as is described below with respect to FIG. 8. In FIG. 1, the combiner 121 and the combiner 122 each receive signals with the same polarization (i.e., a single polarization) from the horns 191, 192 via MMW heads among MMW heads 181, 182, 185, 186. That is, the combiner 121 receives signals with horizontal polarizations from the horn 191 and the horn 192, and the combiner 122 receives signals with vertical polarizations from the horn 191 and the horn 192. In FIG. 1, the combiners 121, 122 are used to exploit the singular use of one spatial direction at a time by the DUT in order to reduce the number of receivers in or used by a device or system that includes the receivers. Each different spatial direction corresponds to the horns 191, 192 being in different locations in the anechoic chamber.

In the embodiment of FIG. 1, the source 111 (transceiver), the source 112 (transceiver), the source 115 (transmitter), and the source 116 (transmitter) are components of a network emulator 100. A network emulator is a test device that emulates a base station by emulating one or more different radio access protocols to test a DUT. The testing of a DUT via different radio access protocols is performed using transmitters, receivers and/or transceivers that are components of the network emulator 100. Specifically, a network emulator is a type of test device, and is configured to simulate the behavior of a network that provides wireless communications between two different devices. As an example, a network emulator may mimic a base station in wireless communications with a mobile device. A base station is an apparatus at the center of a cell in a cellular communication system, and relays communications to and from wireless user devices. Other communications devices with an advanced antenna may also be tested as a DUT, and such other devices include user mobile devices, internal network devices in addition to base stations, wireless routers, communications devices to be installed in vehicles including military vehicles, and other similar communications devices.

In the embodiment of FIG. 1, the DUT may be a mobile phone. A mobile phone is an end wireless user device in a cellular telephone system, and communicates with a centralized relay such as a base station. In use, a mobile phone may be used to implement communications under the forthcoming 5G standard(s), and may also be connected to the internet via broadband cabling such as fiber optic cables. A mobile phone as a DUT may be a prototype being tested before mass production.

In FIG. 1, the received signals with a polarization from the horn 192 are combined with the received signals with the same polarization from the horn 191. When the receivers are elements of the network emulator 100, the receivers may be provided as transceivers. If each transceiver or set of receiver and/or transmitter in the network emulator 100 is considered a connector of/to the network emulator 100, then in FIG. 1 four such connectors are used for transmitting, but only two such connectors are used for receiving. That is, the sources 111, 112, 115, 116 in FIG. 1 may be considered connectors to the network emulator 100, and the sources 111, 112 may be transceivers whereas sources 115, 116 are transmitters. The source 111 as a connector receives the combined signals with horizontal polarization from the horns 191, 192, and the source 112 as a connector receives the combined signals with vertical polarization from the horns 191, 192. Transmissions from the DUT may be received by either or both of the horns 191, 192 and with either polarization. As shown in FIG. 1, the signal received by the horns 191, 192 will be routed to the corresponding MMW head among MMW heads 181, 182, 185, 186 and the combiner among combiners 121, 122 based on the polarization of the received signal and based on which horn among horns 191, 192 receives the received signal.

Figure 2:
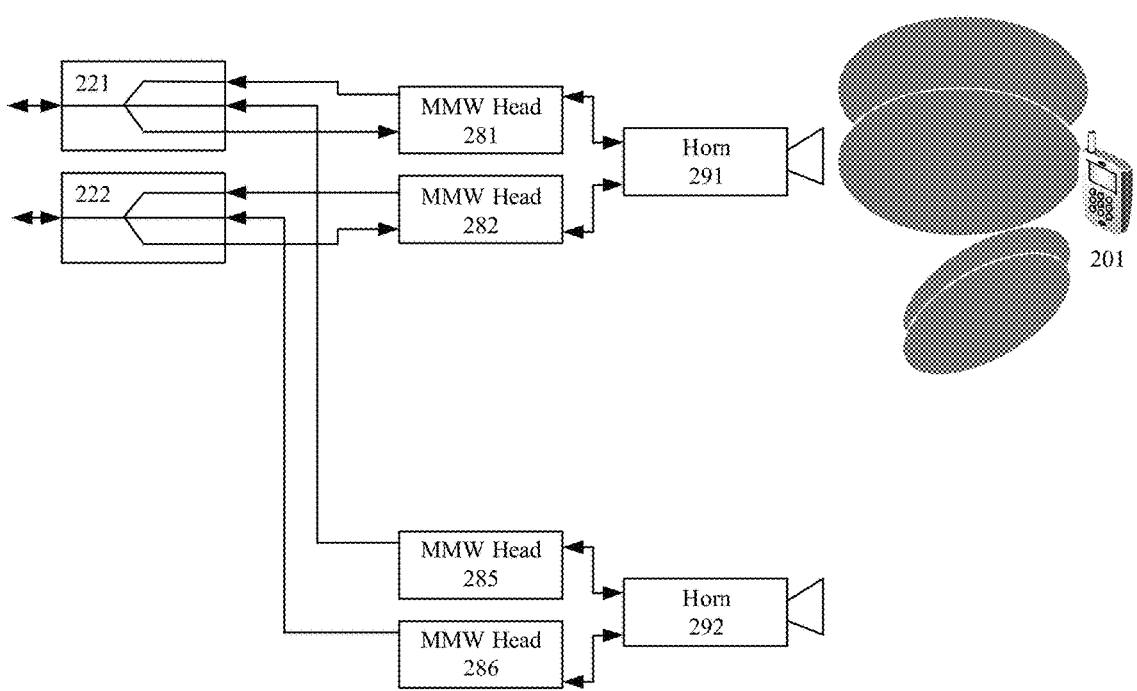
FIG. 2 illustrates another system for over the air beamforming testing with a reduced number of receivers, in accordance with a representative embodiment.

FIG. 2 illustrates another system for over the air beamforming testing with a reduced number of receivers, in accordance with a representative embodiment.

In FIG. 2, the system includes a horn 291, a horn 292, a MMW head 281, a MMW head 282, a MMW head 285, a MMW head 286, a combiner 221 and a combiner 222.

In FIG. 2, the horn 291 receives beamformed signals from DUT 201. The horn 292 also receives beamformed signals from the DUT 201. The DUT 201 may be a prototype of an apparatus that will be specifically configured to communicate wirelessly using an advanced antenna, but is tested as described herein by a network emulator. The testing requires the DUT 201 to transmit signals with its advanced antenna to be detected by the horn 291 and the horn 292 within an anechoic chamber.

The horn 291 and the MMW head 281 communicate via signals with one of a horizontal and a vertical polarization, and the horn 291 and the MMW head 282 communicate via signals with the other of the horizontal and the vertical polarization. The horn 292 and the MMW head 285 communicate with signals with one of a horizontal and a vertical polarization, and the horn 292 and the MMW head 286 communicate with signals of the other of the horizontal and the vertical polarization.

In the system of FIG. 2, the received signals from the MMW head 281 and the MMW head 285, respectively, are provided to the combiner 221. The received signals from the MMW head 282 and the MMW head 286, respectively, are provided to the combiner 222. Transmitted signals from a first source (not shown) are the only transmitted signals shown in FIG. 2 provided to the MMW head 281 via the combiner 221. Transmitted signals from a second source (not shown) are the only transmitted signals shown in FIG. 2 provided to the MMW head 282 via the combiner 222. The first source and second source may be different transmitters or transceivers.

In the embodiment of FIG. 2, the combiners 221, 222 combine received signals that would otherwise be individually provided to different dedicated receivers. Transmitted signals are not combined, and are instead individually provided each to a corresponding and dedicated MMW head among MMW heads 281, 282, 285, 286. In the embodiment of FIG. 2, only two receivers or transceivers are used for all four received signals from the MMW heads 281, 282, 285, 286.

In the embodiment of FIG. 2, the DUT 201 might transmit using only one spatial direction. Nevertheless, radiation patterns in the DUT 201 and the horns 291, 292 will not always be ideal. In FIG. 2, signals with the same polarization from different horns are combined. Isolation between the desired signal and the undesired signal is achieved by virtue of the different gains of the radiation patterns. Since cross-polarization isolation within a horn may also not be ideal, the alternative of combining the two polarizations of a horn (i.e. combining MMW head 281 and 282 in combiner 221) will present cross-polarization interference that will negatively affect the quality of the combined received signal. In the embodiments of FIG. 1 and FIG. 2, the received signals of a single polarization from different horns among the horns 191, 192 or horns 291, 292 are combined, so as to avoid the cross-polarization interference by attenuating one of the paths by means of the difference in the radiation diagrams of the DUT and the horn. In the embodiments of FIG. 1 and FIG. 2, although a horn among the horns 191, 192 or horns 291, 292 might receive an undesirable signal, the received signal will be attenuated since it comes from a radiated side lobe and has a different gain from the different radiation pattern.

Interference may be reduced even more than in the arrangement of FIG. 1 and the arrangement of FIG. 2 by combining received signals of different polarizations from different horns. If both polarizations are used for signals received at a single horn, the different signals with each polarization are routed to different RF ports of a network emulator, and can be decoded correctly. The presence of cross-polarization from both polarizations in this case can be assimilated as part of the MIMO channel.

Figure 3:
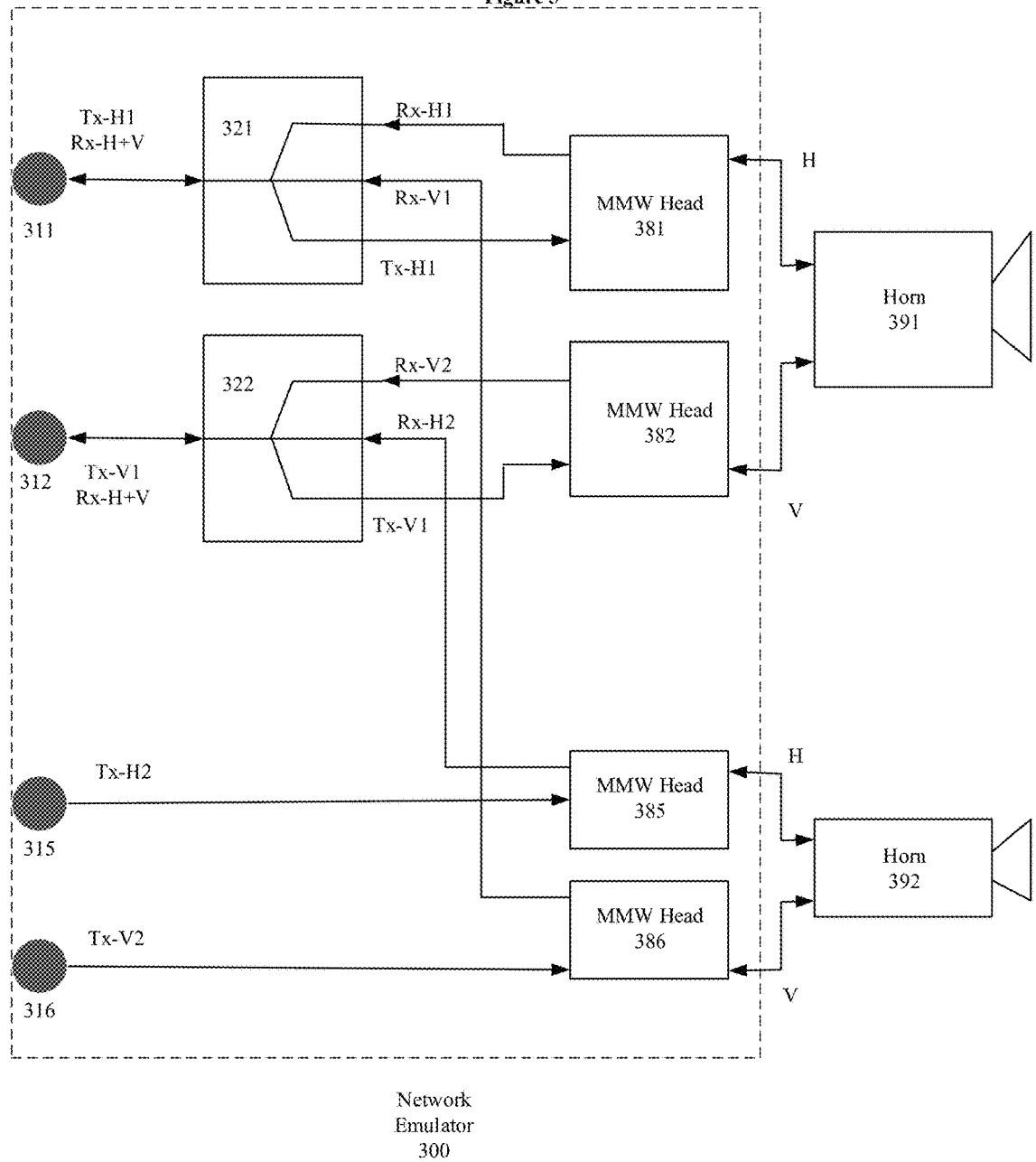
FIG. 3 illustrates another system for over the air beamforming testing with a reduced number of receivers, in accordance with a representative embodiment.

FIG. 3 illustrates another system for over the air beamforming testing with a reduced number of receivers, in accordance with a representative embodiment.

In FIG. 3, the system includes a network emulator 300, a transceiver 311, a transceiver 312, a transmitter 315, a transmitter 316, a horn 391, a horn 392, a MMW head 381, a MMW head 382, a MMW head 385, a MMW head 386, a combiner 321 and a combiner 322. The network emulator 300 is shown by dashed lines, and includes at least the transceiver 311, the transceiver 312, the transmitter 315, the transmitter 316, the combiner 321, the combiner 322, the MMW head 381, the MMW head 382, the MMW head 385 and the MMW head 386. The horn 391 and the horn 392 are provided in an anechoic chamber (not shown) that also includes a DUT (not shown). The horn 391 and the MMW head 381 communicate via signals with a horizontal polarization. The horn 391 and the MMW head 382 communicate via signals with a vertical polarization. The horn 392 and the MMW head 385 communicate with signals with a horizontal polarization. The horn 392 and the MMW head 386 communicate with signals with a vertical polarization. Each of the horns 391, 392 radiates primarily in a different angle of arrival.

In the system of FIG. 3, the received signals with horizontal polarizations Rx-H1 and the received signals with vertical polarizations Rx-V1 are provided from the MMW head 381 and the MMW head 386, respectively, to the combiner 321. The received signals with vertical polarizations Rx-V2 and the received signals with horizontal polarizations Rx-H2 are provided from the MMW head 382 and the MMW head 385, respectively, to the combiner 322. Transmitted signals Tx-H1 from a transceiver 311 are the only transmitted signals shown in FIG. 3 provided to the MMW head 381 via the combiner 321. Transmitted signals Tx-V1 from a transceiver 312 are the only transmitted signals shown in FIG. 3 provided to the MMW head 382 via the combiner 322. Transmitted signals Tx-H2 from a transmitter 315 are the only transmitted signals shown in FIG. 3 provided to the MMW head 385 directly, i.e., and not through any combiner detailed herein. Transmitted signals Tx-V2 from a transmitter 316 are the only transmitted signals shown in FIG. 3 provided to the MMW head 386 directly, i.e., and not through any combiner detailed herein.

In the embodiment of FIG. 3, the combiners 321, 322 combine received signals that would otherwise be individually provided to different dedicated receivers. Transmitted signals are not combined, and are instead individually provided each to a corresponding and dedicated MMW head among MMW heads 381, 382, 385, 386. In FIG. 3, only two receivers or transceivers are used for all four received signals Rx-H1, Rx-H2, Rx-V1, Rx-V2. Additionally, the MMW heads 381, 382, 385, 386 may be divided into groups of two, such that each set of two of the MMW heads 381, 382, and the MMW heads 385, 386 receives signals in two different polarizations from a single horn. The horn 391 and the horn 392 may be in an anechoic chamber, such as is described below with respect to FIG. 8. In FIG. 3, the combiner 321 and the combiner 322 each receive signals with different polarizations from different horns among horns 391, 392.

Whereas in the embodiment of FIG. 1, the received signals with the (same) horizontal polarization Rx-H1 and Rx-H2 were both provided from different horns to the combiner 121 together, in the embodiment of FIG. 3, the received signals with different polarizations Rx-H1 and Rx-V1 are provided from different horns to the combiner 321 together. Additionally, whereas in the embodiment of FIG. 1 the received signals with the (same) vertical polarization Rx-V1 and Rx-V2 were both provided from different horns to the combiner 122 together, in the embodiment of FIG. 3, the received signals with different polarizations Rx-H2 and Rx-V2 are provided from different horns to the combiner 322 together. In FIG. 3, the combiners 321, 322 are used to exploit the singular use of one spatial direction at a time by the DUT in order to reduce the number or receivers in or used by a network emulator.

Figure 4:
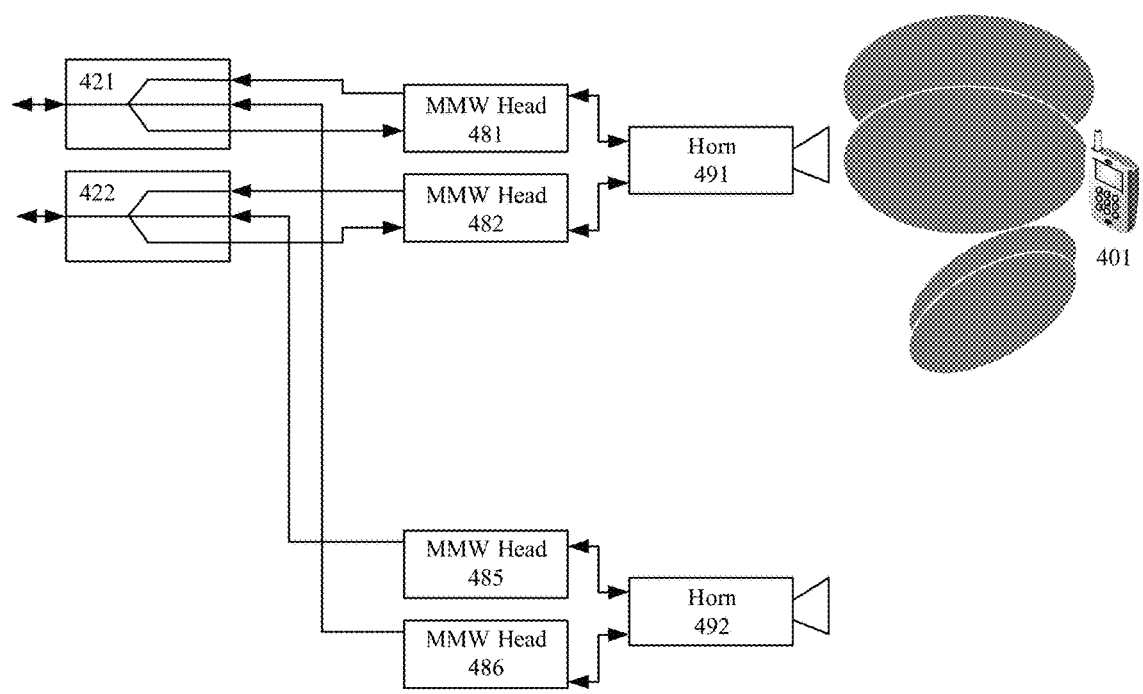
FIG. 4 illustrates another system for over the air beamforming testing with a reduced number of receivers, in accordance with a representative embodiment.

In FIG. 3, the connection scheme improves interference rejection in the desired signal since the interferer signal is attenuated not only by the different gain in the horn reception but also by the cross-polarization rejection in the horn. FIG. 4 shows the path of the desired signal and interferer signal from different MMW heads under this connection scheme. In FIG. 3, the received horizontal polarization signal from the horn 391 is combined with the received vertical polarization of the horn 392, and the received vertical polarization signal from the horn 391 is combined with the received horizontal polarization signal from the horn 392. If the DUT is transmitting in both polarizations, the level of interference is similar as in the first connection scheme of FIGS. 1-2. But if the DUT is transmitting in only one polarization, the interferer signal will be much lower since it will come from a polarization not used by the DUT.

FIG. 4 illustrates another system for over the air beamforming testing with a reduced number of receivers, in accordance with a representative embodiment.

In FIG. 4, the system includes a horn 491, a horn 492, a MMW head 481, a MMW head 482, a MMW head 485, a MMW head 486, a combiner 421 and a combiner 422. In FIG. 4, the horn 491 receives beamformed signals from the DUT 401. The horn 492 also receives beamformed signals from the DUT 401. The horn 491 and the MMW head 481 communicate via signals with one of a horizontal and a vertical polarization, and the horn 491 and the MMW head 482 communicate via signals with the other of the horizontal and the vertical polarization. The horn 492 and the MMW head 485 communicate with signals with one of a horizontal and a vertical polarization, and the horn 492 and the MMW head 486 communicate with signals of the other of the horizontal and the vertical polarization.

In the system of FIG. 4, the received signals from the MMW head 481 and the MMW head 486, respectively, are provided to the combiner 421. The received signals from the MMW head 482 and the MMW head 485, respectively, are provided to the combiner 422. Transmitted signals from a first source (not shown) are the only transmitted signals shown in FIG. 4 provided to the MMW head 481 via combiner 421. Transmitted signals from a second source (not shown) are the only transmitted signals shown in FIG. 4 provided to the MMW head 482 via combiner 422. The first source and second source may be different transmitters or transceivers.

In the embodiment of FIG. 4, the combiners 421, 422 combine received signals that would otherwise be individually provided to different dedicated receivers. Transmitted signals are not combined, and are instead individually provided each to a corresponding and dedicated MMW head among MMW heads 481, 482, 483, 484. In the embodiment of FIG. 4, only two receivers or transceivers are used for all four received signals from the MMW heads 481, 482, 483, 484.

Figure 5:
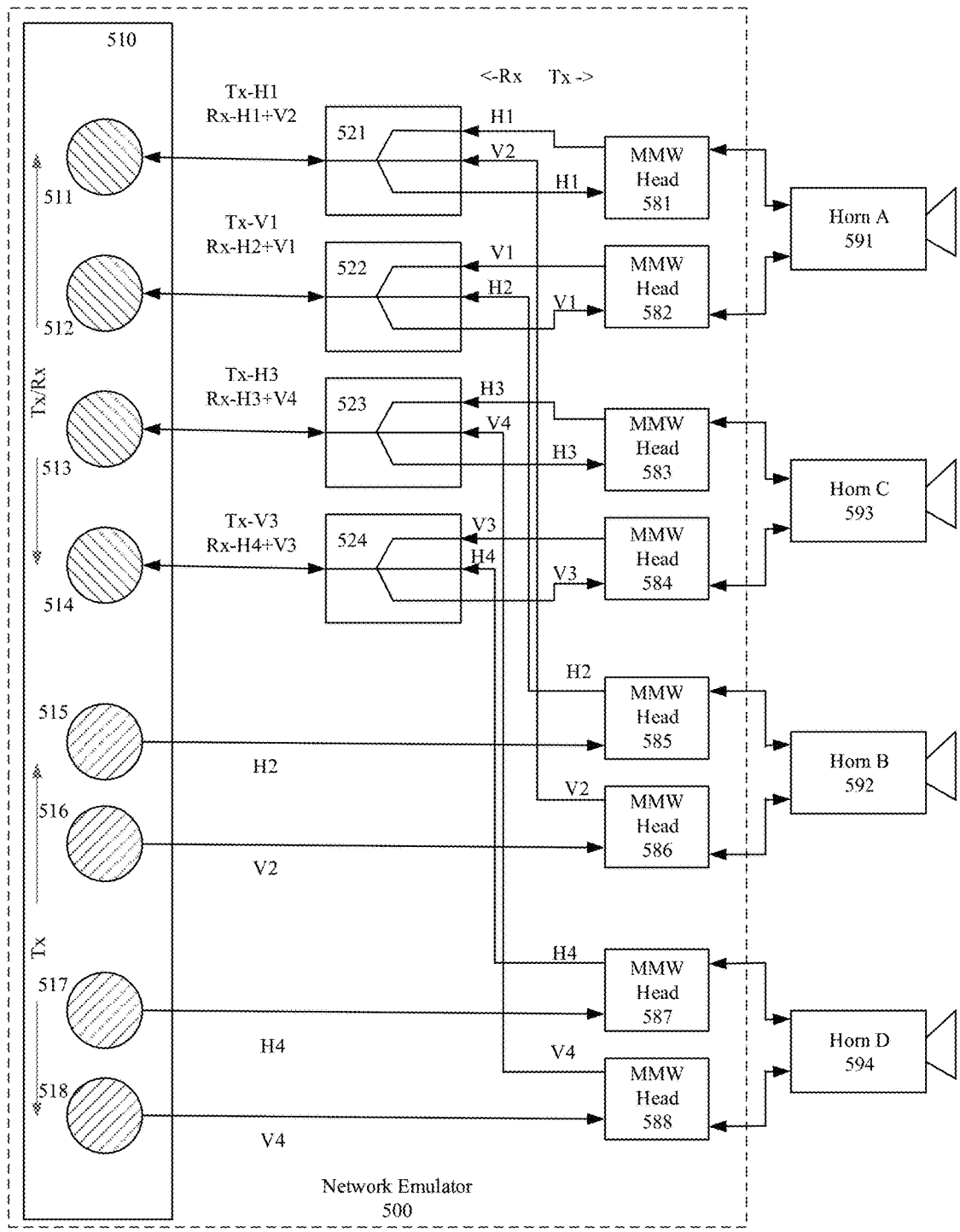
FIG. 5 illustrates another system for over the air beamforming testing with a reduced number of receivers, in accordance with a representative embodiment.

FIG. 5 illustrates another system for over the air beamforming testing with a reduced number of receivers, in accordance with a representative embodiment. FIG. 5 shows an example of a complete connection diagram of a test system using four (4) horns each with two (2) polarizations. Traditionally, this kind of setup would require a network emulator to have eight (8) transmitters and eight (8) receivers. The scheme in FIG. 5 below reduces the number of required receivers to four (4).

In FIG. 5, the system includes a network emulator 500, transmit/receive section 510, a transceiver 511, a transceiver 512, a transceiver 513, a transceiver 514, a transmitter 515, a transmitter 516, a transmitter 517, a transmitter 518, a horn 591, a horn 592, a horn 593, a horn 594, a MMW head 581, a MMW head 582, a MMW head 583, a MMW head 584, a MMW head 585, a MMW head 586, a MMW head 587, a MMW head 588, a combiner 521, a combiner 522, a combiner 523, and a combiner 524. The network emulator 500 is shown by dashed lines, and includes at least the transceiver 511, the transceiver 512, the transceiver 513, the transceiver 514, the transmitter 515, the transmitter 516, the transmitter 517, the transmitter 518, the combiner 521, the combiner 522, the combiner 523, the combiner 524, the MMW head 581, the MMW head 582, the MMW head 583, the MMW head 584, the MMW head 585, the MMW head 586, the MMW head 587, and the MMW head 588. The horn 591, the horn 592, the horn 593 and the horn 594 are all provided in an anechoic chamber (not shown) that also includes a DUT. Altogether in FIG. 5, there are four horns, eight MMW heads, four combiners, and eight transceivers or transmitters. Notably, the positions of the four horns, i.e., the horn 591, the horn 592, the horn 593, and the horn 594, are representative of a physical arrangement in the system of FIG. 5 in that horn 593 is placed between the horn 591 and the horn 592.

The horn 591 and the MMW head 581 communicate via signals with a horizontal polarization. The horn 591 and the MMW head 582 communicate via signals with a vertical polarization. The horn 593 and the MMW head 583 communicate with signals with a horizontal polarization. The horn 593 and the MMW head 584 communicate with signals with a vertical polarization. The horn 592 and the MMW head 585 communicate via signals with a horizontal polarization. The horn 592 and the MMW head 586 communicate via signals with a vertical polarization. The horn 594 and the MMW head 587 communicate with signals with a horizontal polarization. The horn 594 and the MMW head 588 communicate with signals with a vertical polarization.

In the system of FIG. 5, the received signals with horizontal polarizations Rx-H1 and the received signals with vertical polarizations Rx-V2 are provided from the MMW head 581 and the MMW head 586, respectively, to the combiner 521. The received signals with vertical polarizations Rx-V1 and the received signals with horizontal polarizations Rx-H2 are provided from the MMW head 582 and the MMW head 585, respectively, to the combiner 522. The received signals with horizontal polarizations Rx-H3 and the received signals with vertical polarizations Rx-V4 are provided from the MMW head 583 and the MMW head 588, respectively, to the combiner 523. The received signals with vertical polarizations Rx-V3 and the received signals with horizontal polarizations Rx-H4 are provided from the MMW head 584 and the MMW head 587, respectively, to the combiner 524.

In the system of FIG. 5, transmitted signals Tx-H1 from a transceiver 511 are the only transmitted signals shown in FIG. 5 provided to the MMW head 581 via combiner 521. Transmitted signals Tx-V1 from a transceiver 512 are the only transmitted signals shown in FIG. 5 provided to the MMW head 582 via combiner 522. Transmitted signals Tx-H3 from a transceiver 513 are the only transmitted signals shown in FIG. 5 provided to the MMW head 583 via combiner 523. Transmitted signals Tx-V3 from a transceiver 514 are the only transmitted signals shown in FIG. 5 provided to the MMW head 584 via combiner 524. Transmitted signals H2, V2, H4 and V4 are individually provided directly to MMW heads 585, 586, 587, 588, respectively, i.e., and not through any combiner detailed herein.

In the embodiment of FIG. 5, the combiners 521, 522, 523, 524 combine received signals that would otherwise be individually provided to different dedicated receivers. Transmitted signals are not combined, and are instead individually provided each to a corresponding and dedicated MMW head among MMW heads 581, 582, 583, 584, 585, 586, 587, 588. In FIG. 5, only four receivers or transceivers are used for all eight received signals Rx-H1, Rx-H2, Rx-H3, Rx-H4, RxV1, Rx-V2, Rx-V3, Rx-V4 in FIG. 5. In FIG. 5, the combiners 521, 522, 523, 524 are used to exploit the singular use of one spatial direction at a time by the DUT in order to reduce the number or receivers in or used by the network emulator 500.

The example connection scheme shown in FIG. 5 allows transmitting signals using any of the MMW heads among the MMW heads 581, 582, 583, 584, 585, 586, 587, 588, and in either of the polarizations. The example connection scheme shown in FIG. 5 also allows receiving from a DUT using any of the RF heads among the MMW heads 581, 582, 583, 584, 585, 586, 587, 588 with both or either of the two polarizations. The embodiment of FIG. 5 is obtained by replication of the diagram in FIG. 3.

The connection scheme in FIG. 5 can be replicated to use the basic connectivity setup of FIG. 3 and FIG. 5 for any number of horns. Each pair of horns 591, 593 and 592, 594 used in basic connection units for FIG. 5 has angles of arrival separated as much as possible so that the interference rejection is maximized in the received signal combination. In all cases, the network emulator 500 requires only half the number of receivers as transmitters. Additionally, each pair of horns 591, 593 and 592, 594 may be physically separated within an anechoic chamber as much as possible, such as by being optimized to maximize the distance between assigned pairs while also trying to maintain a similar distance between each pair.

Figure 6:
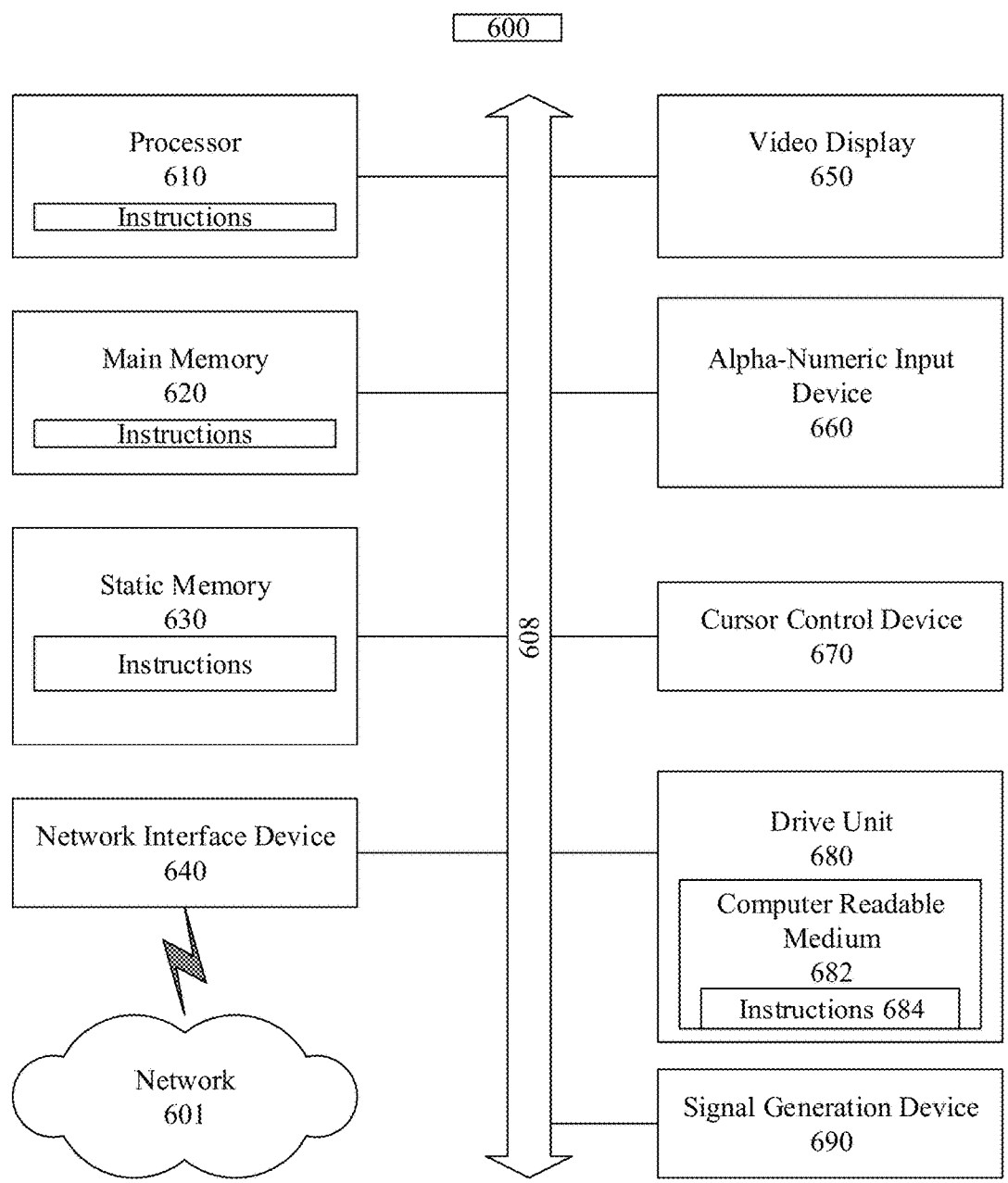
FIG. 6 illustrates a general computer system for over the air beamforming testing with a reduced number of receivers, in accordance with a representative embodiment.

FIG. 6 illustrates a general computer system for over the air beamforming testing with a reduced number of receivers, in accordance with a representative embodiment. The computer system 600 can include a set of instructions that can be executed to cause the computer system 600 to perform any one or more of the methods or computer based functions disclosed herein. The computer system 600 may operate as a standalone device or may be connected, for example, using a network 601, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as the network emulator 500, a stationary computer, a mobile computer, a personal computer (PC), a laptop computer, a tablet computer, a control system, or any other machine capable of executing a set of instructions (sequential or otherwise) that specify actions to be taken by that machine. The computer system 600 can be incorporated as or in a device that in turn is in an integrated system that includes additional devices. In an embodiment, the computer system 600 can be implemented using electronic devices that provide voice or data communication. Further, while a computer system 600 is shown in the singular, the term "system" shall also be taken to include any collection of systems or sub-systems that individually or jointly execute a set, or multiple sets, of instructions to perform one or more computer functions.

As illustrated in FIG. 6, the computer system 600 includes a processor 610. A processor for a computer system 600 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A processor is an article of manufacture and/or a machine component. A processor for a computer system 600 is configured to execute software instructions to perform functions as described in the various embodiments herein. A processor for a computer system 600 may be a general-purpose processor or may be part of an application specific integrated circuit (ASIC). A processor for a computer system 600 may also be a microprocessor, a microcomputer, a processor chip, a controller, a microcontroller, a digital signal processor (DSP), a state machine, or a programmable logic device. A processor for a computer system 600 may also be a logical circuit, including a programmable gate array (PGA) such as a field programmable gate array (FPGA), or another type of circuit that includes discrete gate and/or transistor logic. A processor for a computer system 600 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 600 includes a main memory 620 and a static memory 630 that can communicate with each other via a bus 608. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 600 may further include a display unit 650, such as a liquid crystal display (LCD), an organic light emitting diode (OLED), a flat panel display, a solid-state display, or a cathode ray tube (CRT). Additionally, the computer system 600 may include an input device 660, such as a keyboard/virtual keyboard or touch-sensitive input screen or speech input with speech recognition, and a cursor control device 670, such as a mouse or touch-sensitive input screen or pad. The computer system 600 can also include a disk drive unit 680, a signal generation device 690, such as a speaker or remote control, and a network interface device 640. The network interface device 640 and the signal generation device 690 are representative of the various receivers, transmitters and transceivers of network emulators described herein.

In an embodiment, as depicted in FIG. 6, the disk drive unit 680 may include a computer-readable medium 682 in which one or more sets of instructions 684, e.g. software, can be embedded. Sets of instructions 684 can be read from the computer-readable medium 682. Further, the instructions 684, when executed by a processor, can be used to perform one or more of the methods and processes as described herein. In an embodiment, the instructions 684 may reside completely, or at least partially, within the main memory 620, the static memory 630, and/or within the processor 610 during execution by the computer system 600.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 682 that includes instructions 684 or receives and executes instructions 684 responsive to a propagated signal; so that a device connected to a network 601 can communicate voice or data over the network 601. Further, the instructions 684 may be transmitted or received over the network 601 via the network interface device 640.

An example process for a network emulator based on the computer system 600 of FIG. 6 follows to provide context for a network emulator described herein. A network emulator may store beam characteristics in a memory. The beam characteristics may include beam gains and beam delays, and may be stored in association with a particular type of advanced antenna of a DUT within an anechoic chamber. The network emulator may control the DUT to provide a series of transmissions via the advanced antenna of the DUT, and horns within the anechoic chamber can be used to detect whether transmission characteristics meet preset expectations. The DUT may use the instructions to control the advanced antenna of the DUT to generate the transmissions in accordance with the instructions. Based on test instructions, the network emulator may perform multiple tests involving the DUT sending and/or receiving signals using beams formed by the advanced antennas. For the purposes of this disclosure, the tests of interest are transmissions by the DUT using its advanced antenna. A memory of the network emulator may store thousands of sets of beam names, beam gains and beam delays, each of which reflects specific testing of corresponding beams in different configurations of an advanced antenna of the DUT. Beam names may be used in the testing, such as when a network emulator identifies a series of beam names for beams to be formed by an advanced antenna of the DUT. Since each beam name corresponds to a set of beam characteristics such as beam gain and beam delay, the DUT can be provided with the characteristics of the beams to be formed by the advanced antenna of the DUT.

Instructions processed by a network emulator may include a type of advanced antenna of the DUT, as well as orientations of the advanced antennas of both the horns in the anechoic chamber and the DUT in the anechoic chamber. The type of advanced antenna of the DUT may be used to specify the number and arrangement of antennas in an array of the advanced antenna or the number and arrangement of radiating antenna elements in a single antenna used as the advanced antenna, though the details for each type of advanced antennas may be pre-configured for testing. The network emulator based on the computer system 600 can cycle through dozens, hundreds or thousands of individual tests that require the DUT to reconfigure its advanced antenna and the power levels provided to the elements of the advanced antenna.

Figure 7A:
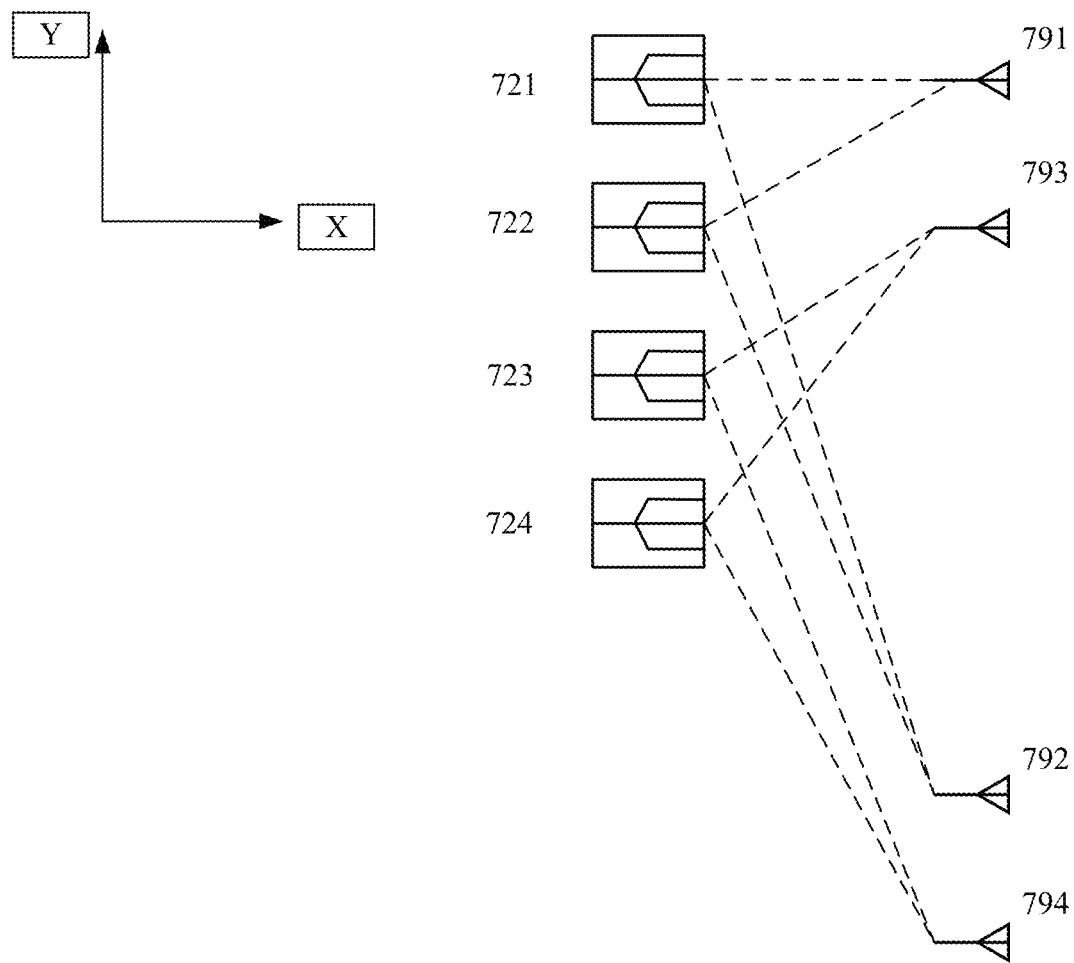
FIG. 7A illustrates a relationship between horns and combiners in two dimensions (XY) in a system for over the air beamforming testing with a reduced number of receivers, in accordance with a representative embodiment.

FIG. 7A illustrates a relationship between horns and combiners in two dimensions (XY) in a system for over the air beamforming testing with a reduced number of receivers, in accordance with a representative embodiment.

In the embodiment of FIG. 7A, the system includes a horn 791, a horn 792, a horn 793, horn 794, a combiner 721, a combiner 722, a combiner 723 and a combiner 724. The view of FIG. 7A is in two dimensions, with the horizontal dimension designated by X and the vertical dimension designated by Y. In FIG. 7A, all broken lines designate only received signals, insofar as each horn feeds received signals with the horizontal polarity and vertical polarity to different combiners. The horn 791 feeds received signals to the combiner 721 and the combiner 722. The horn 793 feeds received signals to the combiner 723 and the combiner 724. The horn 792 feeds received signals to the combiner 721 and the combiner 722. The horn 794 feeds received signals to the combiner 723 and the combiner 724. Insofar as the arrangement of horns among the horns 791, 793, 792, 794 represents a physical arrangement of the horns in at least two dimensions, FIG. 7A represents that the horns 791, 792 are dispersed and used to combine (e.g., alternately) received signals with the horizontal polarity and vertical polarity via the combiners 721, 722, and that horns 793, 794 are dispersed and used to combine (e.g., alternately) received signals with the horizontal polarity and vertical polarity via the combiners 723, 724. In other words, a signal with a horizontal polarity received by any first horn is combined in each combiner of the combiners 721, 722, 723 724 with a signal with vertical polarity received by a second horn that is not adjacent, i.e., is non-adjacent, to the first horn. The adjacency of horns among horns 791, 792, 793, 794 may be determined from a single viewpoint, such as from the side when the horns 791, 792, 793, 794 are aligned vertically, or from above when the horns 791, 792, 793, 794 are aligned horizontally. In FIG. 7, the combiners 721, 722, 723, 724 are used to exploit the singular use of one spatial direction at a time by the DUT in order to reduce the number or receivers in or used by a network emulator.

FIG. 7B illustrates an arrangement of horns in two dimensions (YZ) in a system for over the air beamforming testing with a reduced number of receivers, in accordance with a representative embodiment.

In the embodiment of FIG. 7B, the horn 791, the horn 793, the horn 792 and the horn 794 are aligned in a straight line or a substantially straight line. A substantially straight line may not be perfectly straight, but would include common points of all four of the horns among the horn 791, the horn 793, the horn 792 and the horn 794 within a close distance of a straight line. For example, a deviation of a substantially straight line from a straight line may be no more than a few degrees (e.g., 2 degrees or 5 degrees) from the straight line. In any event, the horn 791, the horn 793, the horn 792 and the horn 794 are shown aligned vertically in a straight line in FIG. 7B, though they may be aligned on or along a line that is offset from vertical too. FIG. 7B is representative of a system wherein horns are aligned or substantially aligned in a straight line in three dimensions, so that the arrangement of horns among the horn 791, the horn 793, the horn 792 and the horn 794 will appear to be linear from any side around the Y axis.

FIG. 7C illustrates another arrangement of horns in two dimensions (YZ) in a system for over the air beamforming testing with a reduced number of receivers, in accordance with a representative embodiment.

In the embodiment of FIG. 7C, the horn 791, the horn 793, the horn 792 and the horn 794 are alternated in the z dimension so that the horn 791 is aligned vertically with the horn 792, and the horn 793 is aligned vertically with the horn 794. FIG. 7C is representative of a system wherein horns are not necessarily aligned in a straight line in three dimensions, so that the arrangement of horns among the horn 791, the horn 793, the horn 792 and the horn 794 will appear to be linear from only two opposite viewpoints around the Y axis.

FIG. 8A illustrates a system overview for over the air beamforming testing with a reduced number of receivers, in accordance with a representative embodiment.

In FIG. 8A, a test device 810 is connected to a DUT 830 over the air at least within an anechoic chamber. The DUT 830 is in an anechoic chamber 890 that includes horns 891 to 894. Although horns 891, 894 are shown and labelled in FIG. 8A, more than two horns may be included within an anechoic chamber 890. The DUT 830 may be a prototype of a mobile device that will be specifically configured to communicate wirelessly (over the air) using an advanced antenna. The testing involves wireless communications using the advanced antenna, and characteristics of beams used for the wireless communications are received by the test device 810 via horns in an anechoic chamber as previously described.

In analog beamforming (i.e., wireless) transmission schemes, both transmission and reception is performed using radiation patterns which focus transmission energy in an intended direction, such as on a horn or horns described herein, or in a specific direction within an anechoic chamber. For testing purposes, from the perspective of an idealized receiver in the intended direction of the signals detected over the air by the horns, the received signal is a combination of the effects of transmission and reception radiation patterns. The channel for each beam can be approximated by only two parameters, i.e., power gain and beam delay, assuming that channel bandwidth is larger than signal bandwidth such that all frequency components of the signal experience the same magnitude of fading. A representative testing practice for over the air beamforming testing is described below.

A power gain between the DUT 830 and the test device 810 will always be a loss for a signal transmitted wirelessly from the DUT 830 to the test device 810. The power gain is the ratio of the level of output power transmitted from the DUT 830 to the level of input power received by the test device 810. The power gain seen by the test device 810 is the combination of the gain of the transmission radiation pattern $G_t(\theta_{tx})$ and the reception radiation pattern $G_{rx}(\theta_{rx})$, where $\theta_{tx}$ and $\theta_{rx}$ are angles of arrival of the beams from the transmitter and the receiver. For example, $\theta_{tx}$ may be the angular difference between horizontal and a beam that runs through the volumetric center of the transmission beam, and $\theta_{rx}$ may be the angular difference between horizontal and a beam that runs through the volumetric center of the reception beam. The combined gain seen by the test device 810 is expressed by equation (1) as follows:

$$G(\theta_{tx},\theta_{rx})=G_t(\theta_{tx}) \cdot G_{rx}(\theta_{rx}) \qquad (1)$$

Additionally, a beam delay is a time delay from when information is transmitted from the DUT 830 to when the information is received by the test device 810. The beam delay will reflect the distance from the DUT 830 to the test device 810, as well as the speed of the signal that carries the information, i.e., the distance per time.

The test device 810 may be a network emulator as described herein, and may be configured with combiners to combine received signals from the horns 891 to 894. As a result, in FIG. 8B shown below, the number of receivers in the transmitters/receivers 818 may be fewer, such as one half (½), compared to the number of receivers in the transmitters/receivers 818.

FIG. 8B illustrates details of a test device and DUT in the system overview of FIG. 8A for over the air beamforming testing with a reduced number of receivers, in accordance with a representative embodiment.

In FIG. 8B, the test device 810 includes a memory 811, a processor 812, transmitters/receivers 818 (which may include signal generators) and an advanced antenna 819. The DUT 830 includes a memory 831, a processor 832, transmitters/receivers 838, and an advanced antenna 839.

The advanced antenna 819 for the test device 810 provides for signal transmission under specified channel conditions, and may be considered the horns 891 to 894. The advanced antenna 839 on the DUT 830 provides for signal transmission under specified channel conditions. For example, the LTE standard defines advanced antennas generally as logical entities distinguished by reference signal sequences. In operation, the advanced antennas 819 are connected to ports on a network emulator or user equipment device emulator, and the advanced antennas 839 are connected to ports on a DUT such as a mobile station or base station.

The test device 810 receives wireless beams from the DUT 830 via the advanced antennas 819, 839. The beam characteristics are analyzed using instructions from the memory 811 by the processor 812. Instructions provided to the test device 810 for testing the DUT 830 in a simulation may include testing information such as a type of advanced antenna of the DUT 830 to use for the simulation, as well as orientations of the advanced antennas 819, 839. The type of advanced antenna of the DUT 830 may be used to specify the number and arrangement of horns 891 to 894, though the details for each type of advanced antennas may alternatively be pre-configured for testing. Similarly, the orientation between the test device 810 and DUT 830 may be fixed in the anechoic chamber, though the advanced antenna 839 can be reoriented by controlling the individual antennas or radiating antenna elements of the advanced antenna 839.

The test device 810 receives signals from the DUT 830 over the air through the advanced antenna 819 and the advanced antenna 839. The test device 810 analyzes the received signals to obtain the beam characteristics using the processor 812. The processor 812 processes the received signal from the transmitters/receivers 818 in accordance with instructions stored in the memory 811. The processing by the processor 812 may involve an algorithm that processes beam characteristics for the test device 810 in normal operations. In other words, according to an aspect of the present disclosure, beam characteristics from the analog beam can be provided to the processor 812 for processing using an algorithm, and the DUT 830 can be tested by testing the algorithm on the beam characteristics of the signal received by the test device 810. Because the number of receivers among the transmitters/receivers 818 is reduced, such as by half, the processing required for received signals from the DUT 830 is substantially reduced.

Accordingly, over the air beamforming testing with a reduced number of receivers enables a reduction in processing complexity by a network emulator. For example, since each receiver in a network emulator is used to demodulate received signals in a different way, the use of fewer receivers reduces the differences in demodulation mechanisms. Other potential benefits of having or simply using fewer receivers in a network emulator include reducing equipment manufacturing costs for manufacturing the network emulator, and reducing verification time and calibration time. Additionally, in the embodiments of FIGS. 3-5, the arrangements of horns are optimized to maximize the diversity of sources of desired signals and interferer signals, and this optimization may be coordinated in terms of both angles of arrival of received signals as well as distance between the horns.

Although over the air beamforming testing with a reduced number of receivers has been described with reference to several exemplary embodiments, it is understood that the words that have been used are words of description and illustration, rather than words of limitation. Changes may be made within the purview of the appended claims, as presently stated and as amended, without departing from the scope and spirit of over the air beamforming testing with a reduced number of receivers in its aspects. Although over the air beamforming testing with a reduced number of receivers has been described with reference to particular means, materials and embodiments, over the air beamforming testing with a reduced number of receivers is not intended to be limited to the particulars disclosed; rather over the air beamforming testing with a reduced number of receivers extends to all functionally equivalent structures, methods, and uses such as are within the scope of the appended claims.

Although the present specification describes components and functions that may be implemented in particular embodiments with reference to particular standards and protocols, the disclosure is not limited to such standards and protocols. For example, standards such as 5G, 5GTF and 3GPP NR represent examples of the state of the art. Such standards are periodically superseded by more efficient equivalents having essentially the same functions. Accordingly, replacement standards and protocols having the same or similar functions are considered equivalents thereof. For example, various forms of digital, analog and hybrid beamforming techniques are some of the most important technologies and transmission schemes under consideration for 5G wireless communication standards (e.g. NR and pre-5G standards). Modifications required under the eventual 5G standard(s) that are not incompatible with teachings of the present disclosure may be made to such teachings in appropriate circumstances.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A testing system for testing a device under test (DUT) by emulating at least one radio access protocol, comprising:
   at least one transmitter configured to use an intermediate frequency for transmission;
   a plurality of receivers configured to use an intermediate frequency for reception;
   a plurality of radio frequency (RF) heads that up-convert the intermediate frequency used by the at least one transmitter to RF used by the DUT and down-convert the RF used by the DUT to the intermediate frequency used by the plurality of receivers; and
   a plurality of combiners that each correspond to a different receiver and that combine beamformed signals received from the DUT via two different RF heads and via a plurality of horns that transmit RF signals to the DUT and receive RF signals from the DUT using two different polarizations.

2. The testing system of claim 1,
   wherein a quantity of the plurality of receivers is smaller than a quantity of the plurality of RF heads from which the signals are received by the plurality of combiners.

3. The testing system of claim 2,
   wherein a quantity of the plurality of RF heads from which the signals are received by the DUT is the same as a quantity of the at least one transmitter.

4. The testing system of claim 1,
   wherein the plurality of horns is arranged in an anechoic chamber, and
   wherein each of the plurality of horns are configured to receive signals in two different polarizations comprising a first polarization and a second polarization.

5. The testing system of claim 4,
   wherein the plurality of RF heads comprises a first RF head from which a signal in the first polarization of a first horn is received by a first combiner and a second RF head from which a signal in the first polarization of a second horn is received by the first combiner.

6. The testing system of claim 1,
   wherein each of the plurality of combiners is configured to receive signals in a single polarization.

7. The testing system of claim 4,
   wherein the plurality of RF heads is divided into groups of two RF heads, and each group of two RF heads receives signals in the two different polarizations from a single horn of the plurality of horns in the anechoic chamber, and
   wherein signals in a single polarization from multiple of the plurality of RF heads are received by each of the plurality of combiners.

8. The testing system of claim 1,
   wherein a quantity of the plurality of receivers is one half a quantity of the plurality of RF heads.

9. The testing system of claim 1
   wherein a quantity of the plurality of receivers is one half a quantity of the at least one transmitter.

10. The testing system of claim 4,
    wherein the plurality of RF heads is divided into groups of two RF heads, and each group of two RF heads receives signals in the two different polarizations from a single horn of a plurality of horns in the anechoic chamber;
    wherein each of the plurality of horns is configured to radiate primarily in a different angle of arrival; and
    wherein the two different polarizations are in perpendicular planes.

11. The testing system of claim 1, further comprising:
    a memory that stores instructions; and
    a processor that executes the instructions to analyze the signals received by the plurality of receivers.

12. A system for testing a device under test (DUT), comprising:
    an anechoic chamber;
    a plurality of horns each configured to radiate primarily in a different angle of arrival in the anechoic chamber using two different polarizations;
    a plurality of radio frequency (RF) heads;
    a plurality of combiners that each combine signals received from the DUT via multiple of the plurality of RF heads;
    at least one transmitter configured to transmit signals to the DUT, and
    a plurality of receivers that each correspond to a different combiner of the plurality of combiners and that receive signals from the plurality of combiners.

13. The system of claim 12,
    wherein a quantity of the plurality of receivers is smaller than a quantity of the plurality of RF heads from which the signals are received by the plurality of combiners.

14. The system of claim 13,
    wherein a quantity of the plurality of RF heads from which the signals are received by the plurality of combiners is the same as a quantity of the at least one transmitter.

15. The system of claim 12,
wherein each of the plurality of horns are configured to receive signals in two different polarizations comprising a first polarization and a second polarization.

16. The system of claim 15,
wherein the plurality of RF heads comprises a first RF head from which a signal in the first polarization of a first horn is received by a first combiner and a second RF head from which a signal in the second polarization of a second horn is received by the first combiner.

17. The system of claim 15,
wherein the plurality of RF heads is divided into groups of two RF heads, and each group of two RF heads receives signals in the two different polarizations from a single horn of a plurality of horns in the anechoic chamber, and wherein signals in a single polarization from multiple of the plurality of RF heads are received by each of the plurality of combiners.

18. The system of claim 12,
wherein a quantity of the plurality of receivers is one half a quantity of the plurality of RF heads.

19. The system of claim 12, further comprising:
a memory that stores instructions; and
a processor that executes the instructions to analyze the signals received by the plurality of receivers.

20. The system of claim 12,
wherein the plurality of horns is aligned to be adjacent in the system; and
at least one of the plurality of combiners combines signals received from the DUT via multiple of the plurality of RF heads that are connected to non-adjacent horns among the plurality of horns.

* * * * *